March 22, 1955  J. T. SCHWINDT ET AL  2,704,495
DITCHER
Filed Sept. 15, 1952                    2 Sheets-Sheet 1
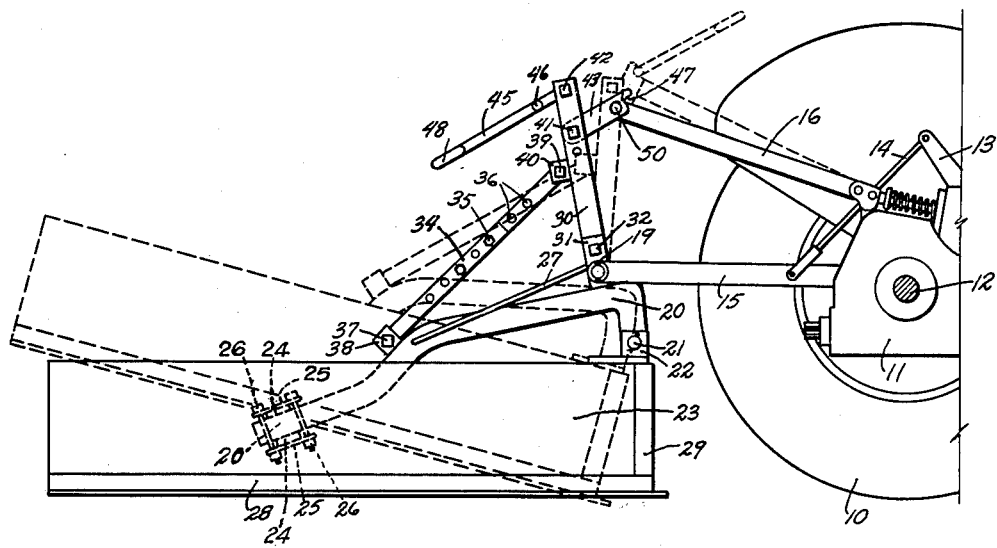
Fig. 1.
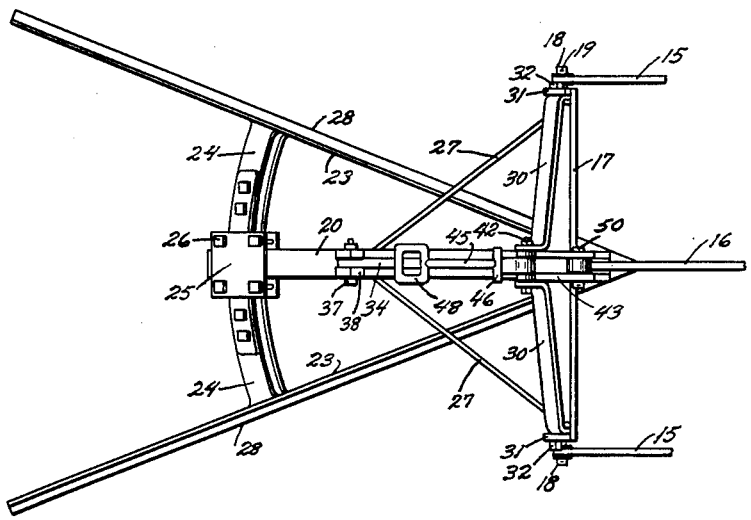
Fig. 2.
INVENTORS
JACKSON T. SCHWINDT
JACK SCHWINDT
BY
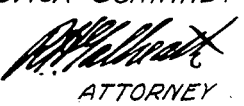
ATTORNEY March 22, 1955  J. T. SCHWINDT ET AL  2,704,495
DITCHER Filed Sept. 15, 1952

INVENTORS
JACKSON T. SCHWINDT
JACK SCHWINDT
BY
ATTORNEY

2,704,495
Patented Mar. 22, 1955

2,704,495
DITCHER

Jackson T. Schwindt and Jack Schwindt,
Fort Morgan, Colo.

Application September 15, 1952, Serial No. 309,602

2 Claims. (Cl. 97—47.5)

This invention relates to a ditch forming and bank building plow, and has for its principal object the provision of a simple, sturdy, and highly efficient ditch plow construction which can be quickly and easily attached to a conventional tractor hitch of the type known as a "Ferguson hitch," such as used on "Ford" tractors, whereby the tractor hitch may be employed for controlling the depth of plowing.

Another object of the invention is to provide a quick-detachable connection for attaching the device to a "Ferguson hitch" whereby the plow may be instantly disconnected from the compression link of the hitch so that it may drop to a free-floating position which will allow the forward extremity of the plow to be elevated over the rearward trailing edges thereof to facilitate travel over rocks, tracks, roads, and other obstructions.

A still further object is to eliminate the use of the supporting wheels usually employed on a ditching plow.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved ditching plow, illustrating it attached to the conventional "Ferguson hitch" of a "Ford" tractor;

Fig. 2 is a plan view thereof without the tractor;

Figure 3:
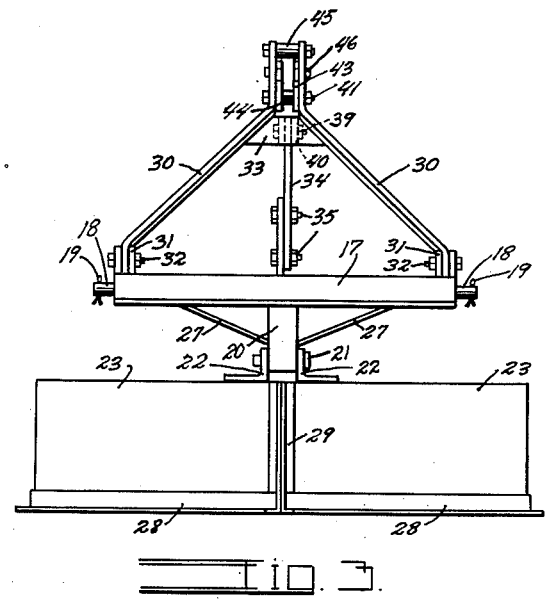
Fig. 3 is a front view of the improved plow.
Figure 4:
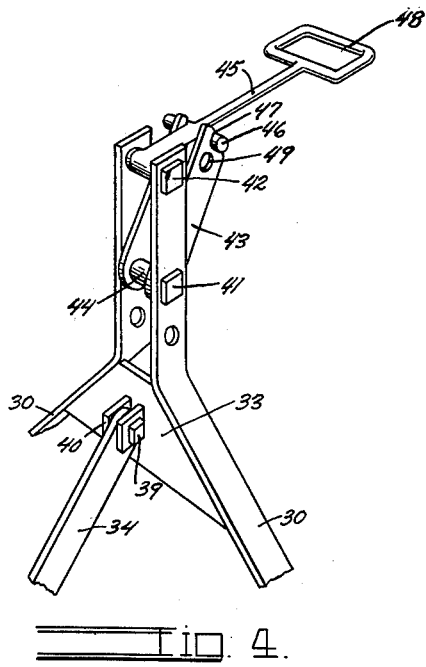
Fig. 4 is a fragmentary, detail, perspective view, illustrating the quick-detaching mechanism employed in the plow.

In the drawing, the rear wheels of a tractor are indicated at 10, the differential gear box at 11, rear axles at 12, hydraulic lift lever at 13, connecting rod at 14, bottom draw bar links at 15, and top compression link at 16. The above-described parts are all standard on the "Ford" tractor. The improved ditching plow is designed to be attached to, and controlled by, the above-enumerated mechanism.

The improved plow comprises a transverse draw bar 17 terminating at its extremities in draw bar studs 18 provided with suitable cotter keys 19. The lower links 15 of the "Ferguson" linkage are provided with draw bar openings, and it is in these openings that the studs 18 of applicant's draw bar 17 are mounted and secured in place by the cotter keys 19.

The draw bar 17 is welded or otherwise fixedly secured at its middle on an L-shaped plow beam 20. The plow beam 20 extends downwardly at its forward extremity, and is secured by means of a mounting bolt 21 between attachment members 22 fixedly mounted on the forward extremities of two flaring mold boards 23.

The mold boards may be braced apart in any desired manner. As illustrated, a pair of cross braces 24 are welded or otherwise secured at their extremities to the mold boards 23 and extend therebetween to hold the latter in separated, V-shaped arrangement. The rear extremity of the plow beam 20 extends between the two braces 24 and is clamped therebetween by means of four clamping bolts 26. The bolts 26 extend between two clamping plates 25 which are drawn toward each other by tightening the bolts 26 so as to firmly clamp the braces into frictional engagement with the plow beam, and the plates 25 into frictional engagement with the braces 24, thus maintaining the plow beam in fixed position between the mold boards 23.

The plow beam is braced against lateral movement relative to the draw bar 17 by means of diagonal brace rods 27 welded or otherwise secured at their extremities to both the draw bar and the plow beam.

The mold boards 23 are reinforced along their bottom edges by means of suitable angle irons 28 welded or otherwise secured therealong, and are reinforced at the apex of the plow by means of a strengthening member 29.

An A-shaped frame is formed from two side brace members 30. Each brace member 30 extends diagonally inwardly and upwardly from between pairs of attachment ears 31 adjacent the extremities of the draw bar 17. The extremities of the brace members 30 are hingedly mounted between the ears 31 on suitable hinge bolts 32. The upper extremities of the brace members 30 extend vertically in parallel, spaced-apart relation, and are fixedly secured together by means of a cross plate 33 which is welded or otherwise secured to the bars.

The A-frame is braced from the plow beam 20 by means of an extendible brace rod 34 formed in two sections adjustably bolted together by means of suitable clamping bolts 35 extending through any selected ones of a plurality of bolt holes 36. The rear extremity of the brace rod 34 is mounted on a hinge bolt 37 in bracket members 38 on the plow beam 20. The upper extremity thereof is similarly mounted on a hinge bolt 39 extending between attachment ears 40 on the plate 33.

A lower bolt 41 and an upper bolt 42 extend between the vertical, parallel portions of the brace members 30. A pair of joined latch links 43 are mounted on the bolt 41 in fixed, parallel, hinged relation, separated by means of a spacing sleeve 44 surrounding the bolt 41.

The extremity of a locking lever 45 is rotatably mounted on the upper bolt 42. A locking cross bar 46 projects oppositely outward from the lever 45 adjacent the bolt 42 and is positioned to swing into receiving notches 47 formed in the upper extremity of the latch links 43. The locking lever 45 is provided with a suitable hand gripping loop 48 at its free extremity.

The latch links 43 are provided with aligned bolt holes 49 adjacent their upper extremities. The upper compression link 16 of the "Ferguson" hitch is secured at its rearward extremity between the two latch links 43 by means of a suitable attachment pin 50 which is passed through the bolt openings 49.

To place the mold boards 23 in the plowing or angular ditch-forming position, the rearward extremities thereof are elevated, as shown in broken line in Fig. 1. This swings the A-frame forwardly and the latch links 43 upwardly to the broken-line position of Fig. 1, in which position the locking lever 45 may be swung forwardly and downwardly to engage the locking cross bar 46 in the receiving notches 47. The mold boards 23 are now supported in an inclined position, with their rear extremities upwardly. The degree of incline depends upon the setting of the two sections of the extendible brace rod 34.

The hydraulic mechanism 13 and 14 on the tractor may now be operated to swing the bottom draw bar links 15 downwardly so as to lower the apex or point of the ditching plow any desired distance into the ground so as to plow a V-shaped ditch the width of which is controlled by the setting of the brace members 24, and the depth of which is controlled by the setting of the hydraulic mechanism on the tractor.

When the plow is not to be used for ditching, the operator can reach back and lift the locking lever 45, causing the cross bar 46 to lift from its locking notches 47. This allows the A-shaped frame to swing rearwardly and the rearward extremities of the mold boards 23 to swing downwardly onto the ground, as shown in Fig. 1. Operation of the hydraulic lift now swings the bottom draw bar links 15 upwardly and elevates the point or apex of the plow to any desired height, allowing the trailing edges of the mold boards 23 to drag along the ground, so that the plow will freely ride over all obstructions when being transported to a new working position.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for attaching a ditching plow to a tractor of the type having two lower, rearwardly extending, draw bar links and an upper, rearwardly extending link, comprising: a draw bar affixed to and extending transversely of the forward extremity of said plow; means on each extremity of said draw bar for attaching that extremity to one of said lower draw bar links; a frame member extending upwardly from said draw bar; a latch link device hingedly mounted adjacent one extremity to said frame; means on said latch link device for hingedly connecting the latter to said upper link; a locking lever arranged to removably lock the other extremity of said latch link device; a hinge pin in said frame above the hinged extremity of said latch link upon which said locking lever is hingedly mounted; and a latch member on said lever positioned to engage the upper extremity of said latch link device for holding the latter against movement away from said frame.

2. Means for attaching a ditching plow to a tractor as defined in claim 1 in which the locking lever projects forwardly from said latch link device and terminates in a hand hold for lifting said latch member out of engagement with said latch link device.

References Cited in the file of this patent

UNITED STATES PATENTS

| | | |
|---|---|---|
| 2,440,550 | Martin | Apr. 27, 1948 |
| 2,453,723 | Palmer et al. | Nov. 16, 1948 |
| 2,527,613 | Zagurski | Oct. 31, 1950 |
| 2,573,221 | Romig | Oct. 30, 1951 |
| 2,618,213 | Welcher et al. | Nov. 18, 1952 |